United States Patent
Nakase et al.

(10) Patent No.: US 10,175,811 B2
(45) Date of Patent: Jan. 8, 2019

(54) CONNECTOR TAIL, TOUCH SENSOR, AND ELECTRONIC DEVICE

(71) Applicant: SMK Corporation, Tokyo (JP)

(72) Inventors: Takayuki Nakase, Toyama (JP); Yusuke Inoue, Toyama (JP)

(73) Assignee: SMK Corporation, Tokyo (JP)

( * ) Notice: Subject to any disclaimer, the term of this patent is extended or adjusted under 35 U.S.C. 154(b) by 75 days.

(21) Appl. No.: 15/270,002

(22) Filed: Sep. 20, 2016

(65) Prior Publication Data

US 2017/0212630 A1    Jul. 27, 2017

(30) Foreign Application Priority Data

Jan. 21, 2016   (JP) .................................. 2016-009743

(51) Int. Cl.
*G06F 3/041*   (2006.01)

(52) U.S. Cl.
CPC .................................. *G06F 3/0416* (2013.01)

(58) Field of Classification Search
CPC .................................................. G06F 3/0416
See application file for complete search history.

(56) References Cited

U.S. PATENT DOCUMENTS

| | | | | |
|---|---|---|---|---|
| 4,143,935 A * | 3/1979 | Goodman | ............ | H01R 12/675 439/405 |
| 4,401,391 A * | 8/1983 | Kawai | .................... | B41J 25/34 101/93.04 |
| 5,007,858 A * | 4/1991 | Daly | .................... | H01R 23/661 439/498 |
| 9,583,126 B1 * | 2/2017 | Biskeborn | .............. | H05K 1/028 |
| 2005/0012199 A1 * | 1/2005 | Rosenau | .............. | G02B 6/4201 257/696 |
| 2005/0174336 A1 * | 8/2005 | Nakayama | .............. | G06F 3/016 345/173 |
| 2005/0176310 A1 * | 8/2005 | Kataoka | .................. | H01R 4/02 439/876 |
| 2008/0158181 A1 * | 7/2008 | Hamblin | .............. | G06F 3/0416 345/173 |

(Continued)

FOREIGN PATENT DOCUMENTS

| CN | 205680074 U | * 11/2016 |
|---|---|---|
| JP | 2011-248667 A | 12/2011 |
| JP | 2011248667 A | * 12/2011 |

OTHER PUBLICATIONS

Flex-Rigid Design Guide, Mar. 2018, Wurth Electronik, all pages (Year: 2018).*

(Continued)

*Primary Examiner* — Nitin Patel
*Assistant Examiner* — Robert M Stone

(57) ABSTRACT

The objective is to reduce stress applied to a connector tail. The connector tail is configured such that a slit of length L having an opening end is formed at one end side, a leading end part is branched by the slit into at least a first connection portion and a second connection portion, and when the distance between the first connection portion and the second connection portion while the first connection portion and the second connection portion are deformed to form an angle θ is set as H, the following relationship holds:

$H/L \leq 0.07$ (where the units of $H$ and $L$ are millimeters and $\theta \leq 4$).

7 Claims, 5 Drawing Sheets

(56) References Cited

U.S. PATENT DOCUMENTS

| | | | | |
|---|---|---|---|---|
| 2008/0158183 A1* | 7/2008 | Hotelling | G06F 3/0416 | 345/173 |
| 2010/0085320 A1* | 4/2010 | Kuwajima | G02F 1/13338 | 345/173 |
| 2011/0094775 A1* | 4/2011 | Lin | H05K 1/118 | 174/254 |
| 2011/0094993 A1* | 4/2011 | Hamblin | G06F 3/0416 | 216/41 |
| 2012/0146919 A1* | 6/2012 | Kim | G06F 3/044 | 345/173 |
| 2012/0293470 A1* | 11/2012 | Nakata | H01J 11/12 | 345/204 |
| 2013/0107476 A1* | 5/2013 | Wright | G09G 3/3208 | 361/752 |
| 2013/0161177 A1* | 6/2013 | Lee | G06F 3/044 | 200/512 |
| 2013/0201620 A1* | 8/2013 | Schlaupitz | H01R 12/57 | 361/679.27 |
| 2016/0282984 A1* | 9/2016 | Chang | G06F 3/0416 | |
| 2016/0313856 A1* | 10/2016 | Matsumoto | G06F 3/0416 | |
| 2017/0160827 A1* | 6/2017 | Nakase | G06F 3/041 | |
| 2017/0188469 A1* | 6/2017 | Taguchi | H05K 3/284 | |

OTHER PUBLICATIONS

Ben Jordan, Altium Rigid-Flex PCB Design, 2018, all pages (Year: 2018).*

Mark Finstad, Basics of Flex Circuit Design, Minco, 2008, all pages (Year: 2008).*

* cited by examiner

CONNECTOR TAIL, TOUCH SENSOR, AND ELECTRONIC DEVICE

CROSS REFERENCE TO RELATED APPLICATION

The contents of the following Japanese patent application are incorporated herein by reference,
Japanese Patent Application No. 2016-009743 filed on Jan. 21, 2016.

FIELD

The present invention relates to a connector tail, a touch sensor, and an electronic device.

BACKGROUND

In recent years, there have been widely diffused touch panels (also called touch screens or the like) in which a touch sensor for detection of an operation input is arranged on a display element such as a liquid crystal display element included in a mobile device, a cellular phone, a car navigation system, or the like. In general, a flat plate-like conductor for retrieving a signal (hereinafter, called connector tail as appropriate) is externally connected to the touch sensor. The connector tail is also called flexible tail, lead wire, tail conductor, tail, or the like. For example, JP-A-2011-248667 shown below describes a capacitance sensor in which the leading end of a connector tail is branched into two and the branched leading ends are connected to vertically arrange base materials, respectively.

SUMMARY

When the branched leading ends of the connector tail are connected to the base materials, stress (load) resulting from the deformation of the connector tail remains on the connection spots. Accordingly, stress is always applied to the connection spots after the connection, and the connection spots may separate from the base materials.

Therefore, one of objects of the present invention is to provide a connector tail, a touch sensor, and an electronic device that reduce (relieve) stress applied to the connection spots of the connector tail.

To solve the foregoing problem, for example, an embodiment of the present invention is a connector tail in which a slit of length L having an opening end is formed at one end side, a leading end part is branched by the slit into at least a first connection portion and a second connection portion, and when the distance between the first connection portion and the second connection portion while the first connection portion and the second connection portion are deformed to form an angle θ is set as H, the following relationship holds:

$H/L \leq 0.07$ (where the units of $H$ and $L$ are millimeters and $\theta \leq 4$).

In the foregoing connector tail, the leading end of the first connection portion may protrude beyond the leading end of the second connection portion.

In the foregoing connector tail, a base part with a first width and a leading end part with a second width larger than the first width may be formed continuously.

In the foregoing connector tail, the thickness of the leading end part may be smaller than the thickness of the base part.

In the foregoing connector tail, the slit may have a width of the open end and a width larger than the width of the open end.

In the foregoing connector tail, two slits may be formed and the leading end part may be branched into a first connection portion, a second connection portion, and a third connection portion.

For example, another embodiment of the present invention is a connector tail in which a slit of length L having an opening end is formed at one end side, a leading end part is branched by the slit into at least a first connection portion and a second connection portion, and the slit has a width of the open end and a width larger than the width of the open end.

Another embodiment of the present invention may be a touch sensor including the foregoing connector tail and a sensor part connected to the connector tail.

In addition, Another embodiment of the present invention may be a touch sensor including a connector tail and a sensor part connected to the connector tail. The connector tail has a slit of length L having an open end at one end side. A leading end part is branched by the slit into at least a first connection portion and a second connection portion. When the angle formed by the first connection portion and the second connection portion is set as θ and the distance between the first connection portion and the second connection portion is set as H, the following relationship holds:

$H/L \leq 0.07$ (where the units of $H$ and $L$ are millimeters, and $3 \leq \theta \leq 4$).

The present invention may be an electronic device including the foregoing touch sensor.

According to the embodiment(s) of the present invention, it is possible to reduce stress applied to the connection spots in the connector tail. Therefore, it is possible to prevent the connection spots in the connector tail from being separated. The contents of the present invention are not limited to the advantageous effects of the present invention exemplified herein.

DESCRIPTION OF EMBODIMENTS

Figure 1:
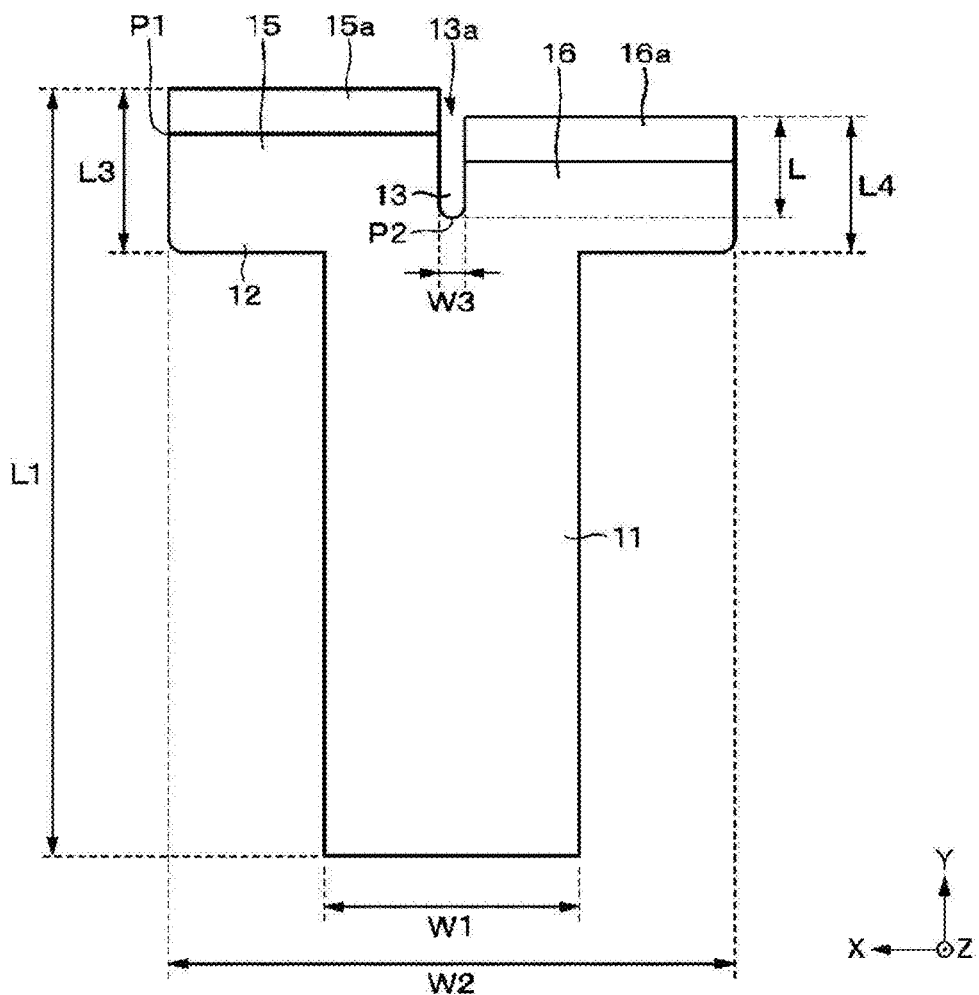
FIG. 1 is a diagram illustrating a shape example of a connector tail according to a first embodiment.

Embodiments of the present invention and others will be explained below with reference to the drawings. The explanation will be given in the following order.
<1. First Embodiment>
<2. Second Embodiment>
<3. Modification Example>

However, the embodiments and others described below intended to exemplify configurations for carrying out the technical idea of the present invention. The present invention is not limited to the exemplified configurations. The members described in the claims are not limited to the members in the embodiments. In particular, unless otherwise specified, descriptions on the dimensions, materials, shapes, relative placements, and upper, lower, leftward, and rightward directions of the constituent members in the embodiments are not intended to limit the scope of the present invention to the descriptions but are mere illustrative examples. The sizes and positional relationships of the members illustrated in the drawings may be exaggerated for the sake of clear explanation. The drawings may include only some of the reference signs to prevent the drawings from being complicated. In the following explanation, the same designations and reference signs indicate identical or coessential members, and duplicated explanations are omitted as appropriate. The elements of the present invention may be configured such that a plurality of elements is formed from one and the same member to allow the one member to serve as the plurality of elements, or may be configured adversely such that the function of one member is shared among the plurality of members.

For the sake of explanation, the directions of an X axis, a Y axis, and a Z axis in the drawings are referred to as length, width, and thickness, respectively. However, the contents of the embodiments of the present invention are not limited by these references.

1. First Embodiment

FIG. 1 is a diagram illustrating a shape example of a connector tail (connector tail 1) according to a first embodiment. The connector tail 1 is configured such that a wiring pattern of copper foil is formed on an insulating tail base such as polyimide or polyethylene terephthalate (PET), and the tail base material is covered with a tail protective sheet material. The connector tail 1 has a generally thin plate-like shape as a whole and has flexibility to a degree that the connector tail 1 can be folded.

The connector tail 1 includes a base part 11 almost rectangular in planar view and a leading end part 12 that extends continuously from the base part 11 and constitutes one end side of the connector tail 1. The leading end part 12 has a slit (cutout) 13 having an open end 13*a* at an end in the approximately center. The leading end part 12 is branched by the slit 13 into a first connection portion 15 and a second connection portion 16. The first and second connection portions 15 and 16 have leading ends 15*a* and 16*a*, respectively, on which connection patterns not illustrated are formed with wiring patterns exposed.

The example of dimensions of the components of the connector tail 1 will be explained. Entire length L1 of the connector tail 1 is set within the range of 80 to 100 mm. Length L of the slit 13 (depth of the slit) is set within the range of 11 to 14 mm. Lengths L3 and L4 of the first and second connection portions 15 and 16 are set within the range of 18 to 25 mm. In the embodiment, the lengths are set to establish the relationship L3>L4 so that the leading end 15*a* of the first connection portion 15 protrudes beyond the leading end 16*a* of the second connection portion 16 in a longitudinal direction.

Width W1 of the base part 11 of the connector tail 1 (first width) is set to 20 to 30 mm. Width W2 of the leading end part 12 (second width) is larger than the width W1 and is set to 50 to 60 mm. By making the width W2 of the leading end part 12 larger than the width W1 of the leading end part 12, it is possible to increase the area of connection of the connector tail 1 to a sensor part 2 described later (area of contact). Width W3 of the slit 13 is set to 1.5 to 2.0 mm. These dimensions are examples and can be changed depending on the use of the connector tail 1 or the like.

Figure 2:
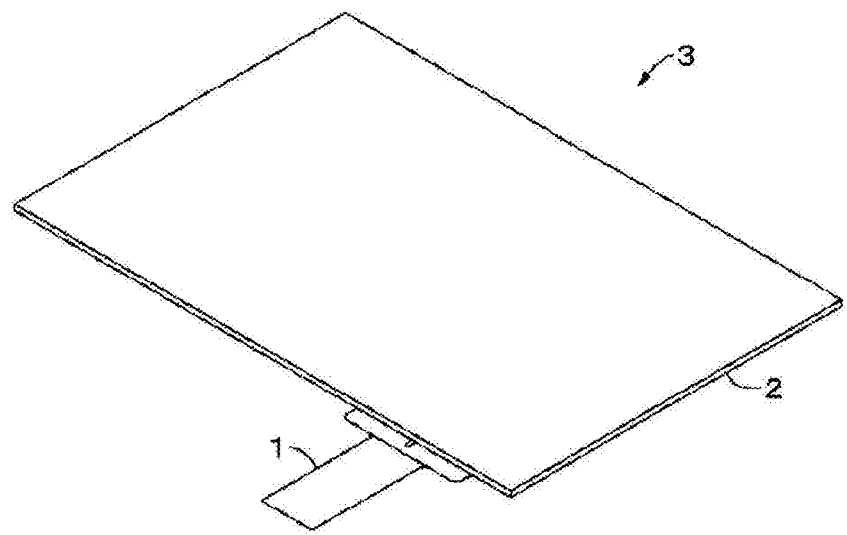
FIG. 2 is a diagram illustrating an example of a touch sensor.

As illustrated schematically in FIG. 2, the connector tail 1 configured as described above is connected to the sensor part 2 to constitute a touch sensor 3. The touch sensor 3 is assembled with an exterior member, a display unit of liquid crystal or organic EL (electro luminescence), a control substrate, and others to constitute a touch panel with adequate configurations. The touch panel is used as an input unit for various electronic devices such as mobile information terminals, cellular phones, and car navigation systems. In relation to the embodiment, descriptions will be given as to a capacitance-type touch sensor in which a large number of electrodes is disposed on an insulating substrate along an input operation area, the detection electrodes with changes in capacitance due to approach of an input operation body such as a finger are detected, and the position of the input operation is detected from the positions of the electrodes.

Figure 3:
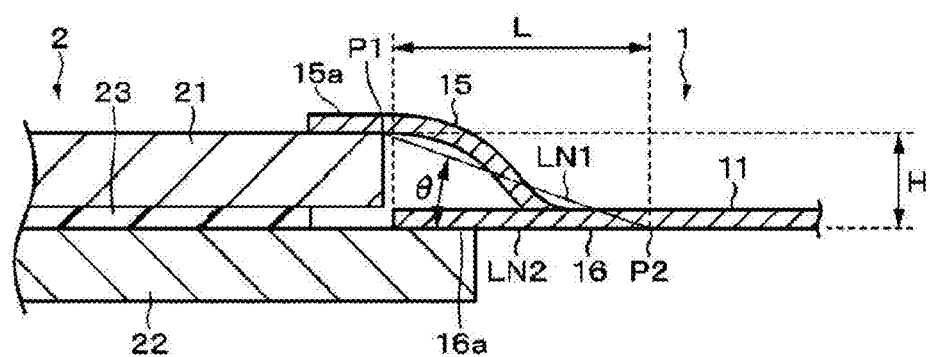
FIG. 3 is a diagram illustrating a connection example of the connector tail to a sensor part.

FIG. 3 is a diagram illustrating a configuration of the sensor part 2 and a connection example of the connector tail 1 and the sensor part 2. The sensor part 2 has base materials 21 and 22 of glass or film. The two base materials 21 and 22 opposed to each other are attached to each other via an attachment layer 23 such as an optical adhesive sheet (OCA (optical clear adhesive)). The base materials 21 and 22 have transparent electrode patterns of ITO (indium tin oxide) film in an X direction and a Y direction. Each of the electrodes has a transparent silver lead pattern printed (these configurations are not illustrated in the drawings). In the embodiment, the transparent electrode pattern in the Y direction is formed on one surface (upper surface) of the base material 21, and the transparent electrode pattern in the X direction is formed on one surface (upper surface) of the base material 22.

The leading ends 15*a* and 16*a* of the first and second connection portions 15 and 16 of the connector tail 1 are thermally compressed and bonded to the lead patterns of the sensor part 2 via an anisotropic conductive film, whereby the connector tail 1 and the sensor part 2 are electrically connected. For example, the first connection portion 15 is bended (lifted) and the leading end 15*a* is connected to the lead pattern of the base material 21 positioned on the upper side, and the leading end 16*a* of the second connection portion 16 is connected to the lead pattern of the base material 22 positioned on the lower side.

Although not illustrated, the other end side of the connector tail 1 (opposite to the leading end part 12) is connected to the control substrate. The control substrate has thereon predetermined electronic components such as a computation unit that processes a signal supplied via the connector tail 1 to detect the position of the operation input, a display controller that controls display on the display unit (or a one-chip IC (integrated circuit) having the same functions), an interface with a processing unit executing control according to the position of the input operation, and others.

As illustrated in FIG. 3, to connect the first and second connection portions 15 and 16 to the base materials 21 and 22, it is necessary to lift one of the connection portions (for example, the first connection portion 15) in the thickness direction. At that time, stress is applied to the slit 13 and its surroundings according to the deformation of the connection portion, and the stress remains on the connected portion. In particular, when the stress also acts on the leading ends 15*a* and 16*a* of the first and second connection portions 15 and 16, the connection spots (thermally compressed and bonded spots) may be separated from each other. Therefore, it is desired to reduce the entire stress such that the stress remaining on the connection spots does not act on the leading ends 15*a* and 16*a*.

The inventor of the present invention has eagerly studied on this respect and found a preferable mode for reducing the stress. In the following explanation, the matters indicated by reference numerals are as follows (see FIG. 3):

Angle θ[°]: Angle formed by the first connection portion 15 and the second connection portion 16 after the deformation (connection). In the embodiment, more specifically, the angle formed by a virtual line LN1 connecting a connection end portion P1 of the leading end 15*a* and a start point P2 of the slit 13 (end portion opposite to the open end) and a virtual line LN2 corresponding to an extension of the connection surface of the leading end 16*a* (to be connected to the base material 22) is set as angle θ.

H [mm]: Distance between the first and second connection portions 15 and 16 after the deformation in the thickness direction. In the embodiment, the distance between the lower surface of the first connection portion 15 and the lower surface of the second connection portion 16 as connection surfaces is set as H.

L [mm]: Length corresponding to the length L of the slit.

The inventor of the present invention has found that the range of numerical values in which the following equation (1) holds when the parameters are specified as described above was a preferable mode for reducing the stress:

$$H/L \geq 0.07 \text{ (where } \theta \geq 4) \tag{1}$$

The values of H/L and θ do not include zero. The range of θ is generally 3≤θ≤4, but θ may be 4.

The following equation (2) holds as the relationship between H/L and the angle θ:

$$\tan \theta = H/L \tag{2}$$

Figure 4A:
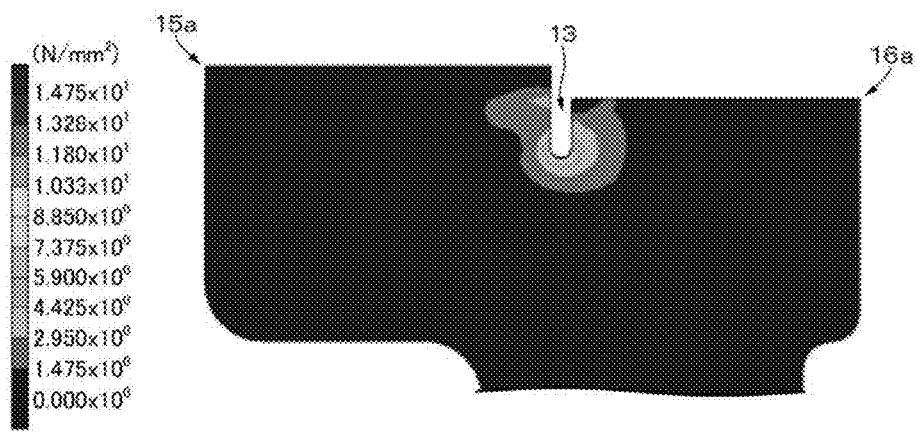
FIG. 4A is a diagram illustrating examples of results of stress simulation.
Figure 4B:
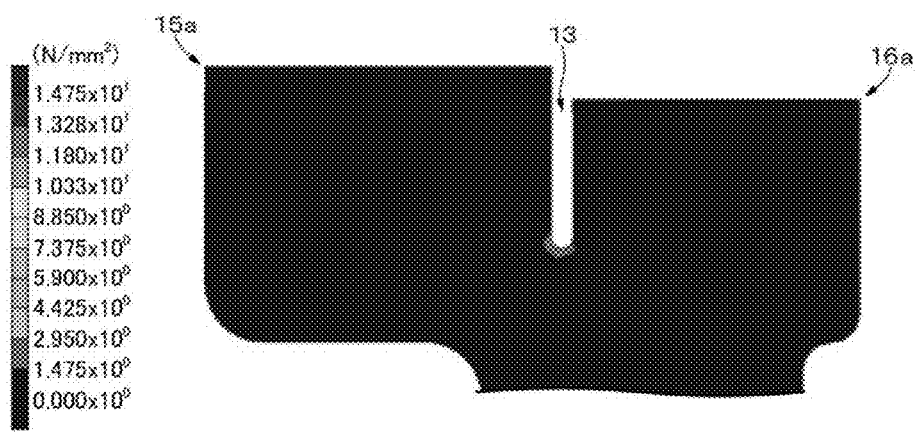
FIG. 4B is a diagram illustrating examples of results of stress simulation.

The inventor of the present invention has determined the distribution of the stress by stress simulation (finite element method) in finding the foregoing preferable mode. FIGS. 4A and 4B show the results. The setting conditions in the stress simulation are as listed below. The unit of the stress is N/mm².

[Setting Conditions in the Stress Simulation Illustrated in FIG. 4A (These Conditions Include the Short Length of the Slit that Falls Outside the Range of the Foregoing Preferable Mode)]
H=0.825
L=5.95
H/L=0.1387
θ=7.89

[Setting Conditions in the Stress Simulation Illustrated in FIG. 4B (These Conditions Fall Within the Range of the Foregoing Preferable Mode)]
H=0.825
L=13.45
H/L=0.0613
θ=3.51

The following matters can be revealed from the simulation results.

As illustrated in FIG. 4A, when the conditions fall outside the range of numerical values in the preferable mode, a stress of up to about 14.75 [N/mm²] is applied to the slit 13 and its surroundings. In addition, the entire stress is large and acts also near the leading ends (in particular, the leading end 16*a* of the second connection portion 16) although it decreases.

Meanwhile, as illustrated in FIG. 4B, when the conditions fall within the range of numerical values in the preferable mode, a stress of only up to about 2.8 [N/mm²] acts on the start point of the slit 13 and its surroundings. The entire stress is small and does not act near the leading ends 15*a* and 16*a* of the first and second connection portions 15 and 16. That is, when the conditions fall within the range of the preferable mode of the present invention, it is possible to prevent stress from acting (remaining) on the leading ends 15*a* and 16*a*, and avoid the separation of the connection spots of the connector tail 1.

EXAMPLES

Examples of the present invention will be explained in more details based on the results of specific experiments. However, the present invention is not limited to the following examples but can be changed as appropriate without deviating from the gist of the present invention.

The following Table 1 indicates comparative examples 1 to 4 and examples 1 and 2. The numbers of occurrences of separation were obtained as described below. First, the parameters such as H, L, and θ were set to the values described in Table 1, and the leading ends 15*a* and 16*a* of the first and second connection portions 15 and 16 were connected to predetermined spots of the sensor part 2 to obtain a touch sensor. The obtained touch sensor was left in a high-temperature, high-humidity tester set in a high-temperature, high-humidity environment at 85° C. and 85% for 750 hours to determine the number of occurrences of separation. The sample number n was set to 5. In addition, as representatives, stress was measured on the comparative example 1 and the example 2.

TABLE 1

| Parameters | Comparative example 1 | Comparative example 2 | Comparative example 3 | Comparative example 4 | Example 1 | Example 2 |
|---|---|---|---|---|---|---|
| H [mm] | 0.825 | 0.825 | 0.825 | 0.825 | 0.825 | 0.825 |
| L [mm] | 5.9 | 6.7 | 7.8 | 9.4 | 11.8 | 13.5 |
| H/L | 0.14 | 0.12 | 0.11 | 0.09 | 0.07 | 0.06 |
| θ [degree] | 8 | 7 | 6 | 5 | 4 | 3.5 |
| Number of occurrences of separation after high-temperature and high-humidity test (n = 5) | 5 | 4 | 3 | 1 | 0 | 0 |

TABLE 1-continued

| Parameters | Comparative example 1 | Comparative example 2 | Comparative example 3 | Comparative example 4 | Example 1 | Example 2 |
|---|---|---|---|---|---|---|
| Remaining stress [N/mm²] | 14.8 | — | — | — | — | 2.8 |

High-temperature and high-humidity testing conditions 85° C., 85% RH 750 hours

From the results shown in Table 1, the number of occurrences of separation is zero in the examples 1 and 2 that fall within the range of numerical values in the preferable mode. That is, the entire stress applied to the slit 13 and its surroundings can be reduced. Accordingly, it is possible to prevent the remaining stress from acting on the leading ends 15*a* and 16*a* and avoid the separation of the connection spots of the connector tail 1.

2. Second Embodiment

Next, a second embodiment will be explained. In the following explanation, duplicate descriptions of the components with the same designations and reference signs will be omitted as appropriate. In addition, the matters explained above in relation to the first embodiment are also applicable to the second embodiment, unless otherwise specified.

Figure 5:
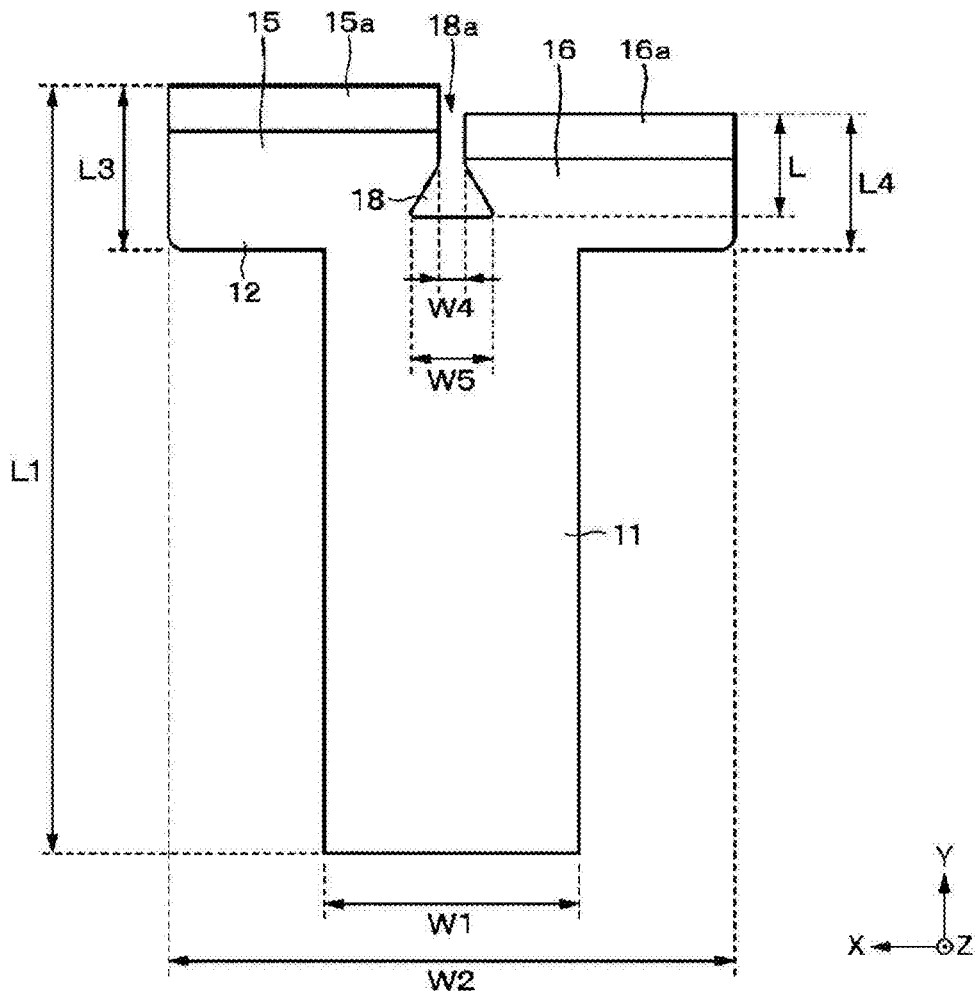
FIG. 5 is a diagram illustrating a shape example of a connector tail according to a second example.

FIG. 5 is a diagram illustrating a shape example of a connector tail (connector tail 1*a*) according to the second embodiment. Unlike the connector tail 1 according to the first embodiment, the connector tail 1*a* has a slit 18 instead of the slit 13. The slit 18 has a width W4 at an open end 18*a*. In addition, the slit 18 is wider inward from the open end 18*a* and has a width W5 larger than the width W4.

The connector tail 1*a* according to the second embodiment as described above also produces the same operations and effects as those of the first embodiment. That is, since the inside of the slit 18 is wider, the leading end part 12 becomes easy to deform (flexible), thereby making it possible to further reduce the stress applied to the slit 18 and its surroundings. With the reduction of the stress, it is possible to prevent the connection spots from separating from the sensor part 2.

Further, the width W3 of the open end of the slit 18 is set to be smaller. This makes it possible to secure the widths of the leading ends 15*a* and 16*a*, and provide the areas of connection to the sensor part 2. Accordingly, it is possible to connect the connector tail 1*b* to the sensor part 2 more reliably in conjunction with the reduction of the stress.

Embodiment(s) of the present invention may be configured in a mode in which the first embodiment and the second embodiment are combined. Specifically, embodiment(s) of the present invention may be the connector tail of the shape illustrated in FIG. 5 in which the values of the parameters are set within the range explained above in relation to the first embodiment.

3. Modification Example

The embodiments of the present invention have been specifically explained so far. However, the present invention is not limited to the foregoing embodiments but can be modified in various manners.

Figure 6:
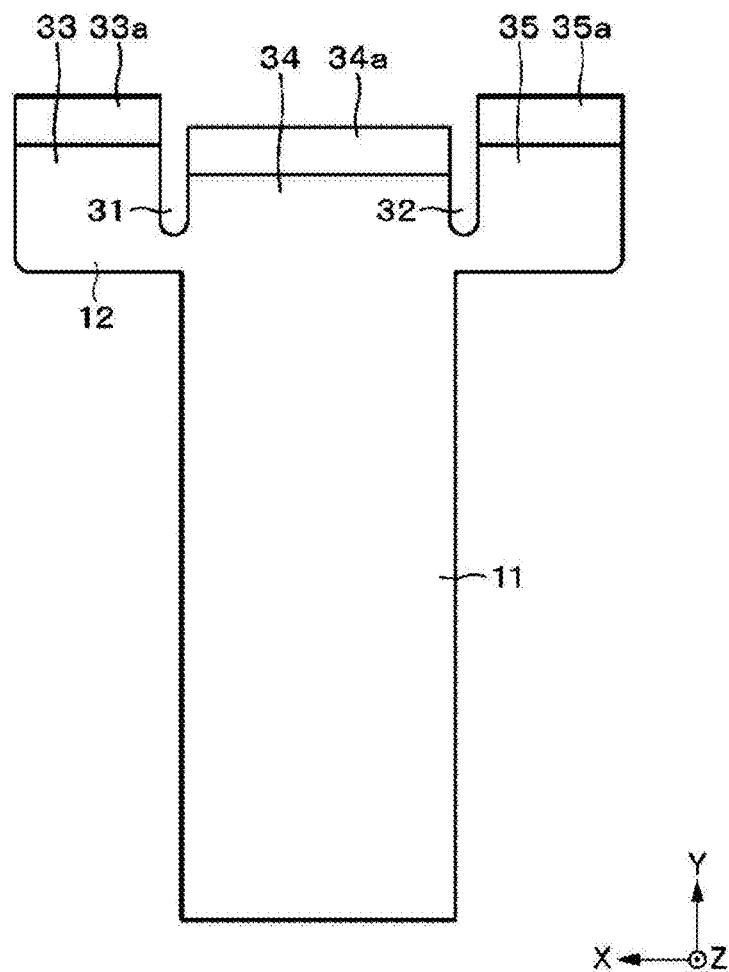
FIG. 6 is a diagram illustrating a shape example of a connector tail according to a modification example.

In the first and second embodiments described above, the leading end part 12 is branched by the slit 13 or the slit 18 into two connection portions. Alternatively, the leading end part 12 may be branched into three connection portions. FIG. 6 is a diagram illustrating a shape example of a connector tail (connector tail 1*b*) according to a modification example. For example, the connector tail 1*b* has two slits 31 and 32 at the leading end part 12. The leading end part 12 is branched by these slits into first, second, and third connection portions 33, 34, and 35. In this manner, the leading end part of the connector tail ray be branched by a plurality of slits into three or more connection portions. In the case of the shape illustrated in FIG. 6, leading ends 33*a* and 35*a* of the first and third connection portions 33 and 35 are connected to the base material 21, and a leading end 34*a* of the second connection portion 34 is connected to the base material 22, for example.

The connector tail 1 and others are not limited to the shapes in the foregoing embodiments.

A predetermined electronic component such as a controller IC may be mounted on the surface of the connector tail 1 or the like (also called Chip on Film or the like).

The shape of the slit 13 is not limited to an oblong shape but may be a rectangle or any other shape. When the slit 13 has the width W4 at the open end and the width W5 longer than the width W4, the shape of the slit 18 can be changed as appropriate. In addition, the positions of formation of the slits 13 and 18 are not limited to the positions illustrated in the drawings but can be changed as appropriate.

In the connector tail 1, the entire or partial thickness of the leading end part 12 may be decreased as compared to the thickness of the base part 11. This allows the leading end part 12 (the first connection portion and the like) to be easily deformed, thereby reducing the stress.

In the case of a touch sensor in which a connector tail and a sensor part are integrated, an embodiment of the present invention may be configured as a touch sensor including: a connector tail and a sensor part to which the connector tail is connected. The connector tail has a slit of length L having an open end at one end side. The one end side is branched by the slit into at least a first connection portion and a second connection portion. When the angle formed by the first connection portion and the second connection portion is set as θ and the distance between the first connection portion and the second connection portion is set as H, the following relationship holds:

$$H/L \leq 0.07 \text{ (where the units of } H \text{ and } L \text{ are millimeters and } 3 \leq \theta \leq 4).$$

In the case of the foregoing configuration, H may be approximated by the height of surfaces to which the first and second connection portions 15 and 16 are compressed and bonded (in the example of FIG. 3, the total of heights of the base material 21 and the attachment layer 23). In addition, L may be approximated by the distance from the end surface of the base material to which the deformed connection portion (for example, the first connection portion) is connected to the start point of the slit.

A transparent electrode pattern may be formed in the X direction on one surface (upper surface) of the base material 21 of the sensor part 2 and a transparent electrode pattern may be formed in the Y direction on one surface (upper surface) of the base material 22.

The sensor part 2 is not limited to an attachment structure but may have a single-side layered structure in which transparent electrode patterns are formed in the X direction and Y direction on one surface of the one base material.

The shape of the sensor part 2 is not limited to a flat-plate shape but may be a spherical shape, a cylindrical shape, or the like.

The configurations, methods, processes, shapes, materials, numerical values, and others described in relation to the foregoing embodiments and modification example are mere examples, and any other configurations, methods, processes, shapes, materials, numerical values, and others may be used as necessary or publicly-known ones may be used as substitutes. In addition, the configurations, methods, processes, shapes, materials, numerical values, and others in the embodiments and modification example can be combined together as far as no technical conflicts take place.

Further, embodiments of the present invention can be implemented in arbitrary modes such as connector tails, touch sensors, electronic devices including touch sensors, and others.

The invention claimed is:

1. A touch sensor comprising:
   a connector tail; and
   a sensor part connected to the connector tail, wherein
   the connector tail has a slit of length L having an open end at one end side,
   a leading end part is branched by the slit into at least a first connection portion and a second connection portion, and
   when the angle formed by the first connection portion and the second connection portion is set as θ and the distance between the first connection portion and the second connection portion is set as H, the following relationship holds:

$H/L \leq 0.07$ (where the units of $H$ and $L$ are millimeters, and $3 \leq \theta \leq 4$).

2. The touch sensor according to claim 1, wherein the leading end of the first connection portion protrudes beyond the leading end of the second connection portion.

3. The touch sensor according to claim 1, wherein a base part with a first width and the leading end part with a second width larger than the first width are formed continuously.

4. The touch sensor according to claim 3, wherein the thickness of the leading end part is smaller than the thickness of the base part.

5. The touch sensor according to claim 1, wherein the slit has a width of the open end and a width larger than the width of the open end.

6. The touch sensor according to claim 1, wherein two slits are formed and the leading end part is branched into a first connection portion, a second connection portion, and a third connection portion.

7. An electronic device comprising the touch sensor according to claim 1.

* * * * *